United States Patent [19]

Erdman et al.

[11] Patent Number: 5,117,479
[45] Date of Patent: May 26, 1992

[54] CLAMP FOR SPLIT CABLE OF MULTIPLE OPTICAL FIBERS

[75] Inventors: David D. Erdman; Kevin T. Monroe, both of Harrisburg; Robert N. Weber, Hummelstown, all of Pa.

[73] Assignee: AMP Incorporated, Harrisburg, Pa.

[21] Appl. No.: 609,323

[22] Filed: Nov. 2, 1990

[51] Int. Cl.⁵ .......................... G02B 6/36; G02B 6/00
[52] U.S. Cl. .................................................. 385/136
[58] Field of Search ......................... 350/96.20–96.23

[56] References Cited

U.S. PATENT DOCUMENTS

| | | | |
|---|---|---|---|
| 3,332,053 | 7/1967 | Busler | 339/210 |
| 3,836,944 | 9/1974 | Lawson | 339/99 R |
| 4,645,295 | 2/1987 | Pronovost | 350/96.20 |
| 4,759,599 | 7/1988 | Yamaguchi et al. | 350/96.21 |
| 4,826,277 | 5/1989 | Weber et al. | 350/96.23 |

Primary Examiner—Akm E. Ullah
Attorney, Agent, or Firm—Gerald K. Kita

[57] ABSTRACT

A clamp comprising; two sections 12, 12 hinged together for closure toward each other and onto an exterior of a divisible, multiple fiber cable 2, friction surfaces 24, 24 of the sections 12, 12 are adapted for engaging along an exterior of a first portion 25 of the multiple fiber cable 2, for holding the first portion 25 together while the multiple fiber cable 2 is split partially along its length into single fiber cables 3, 3 and while optical connectors 5, 5 are assembled to the single fiber cables 3, 3.

11 Claims, 4 Drawing Sheets

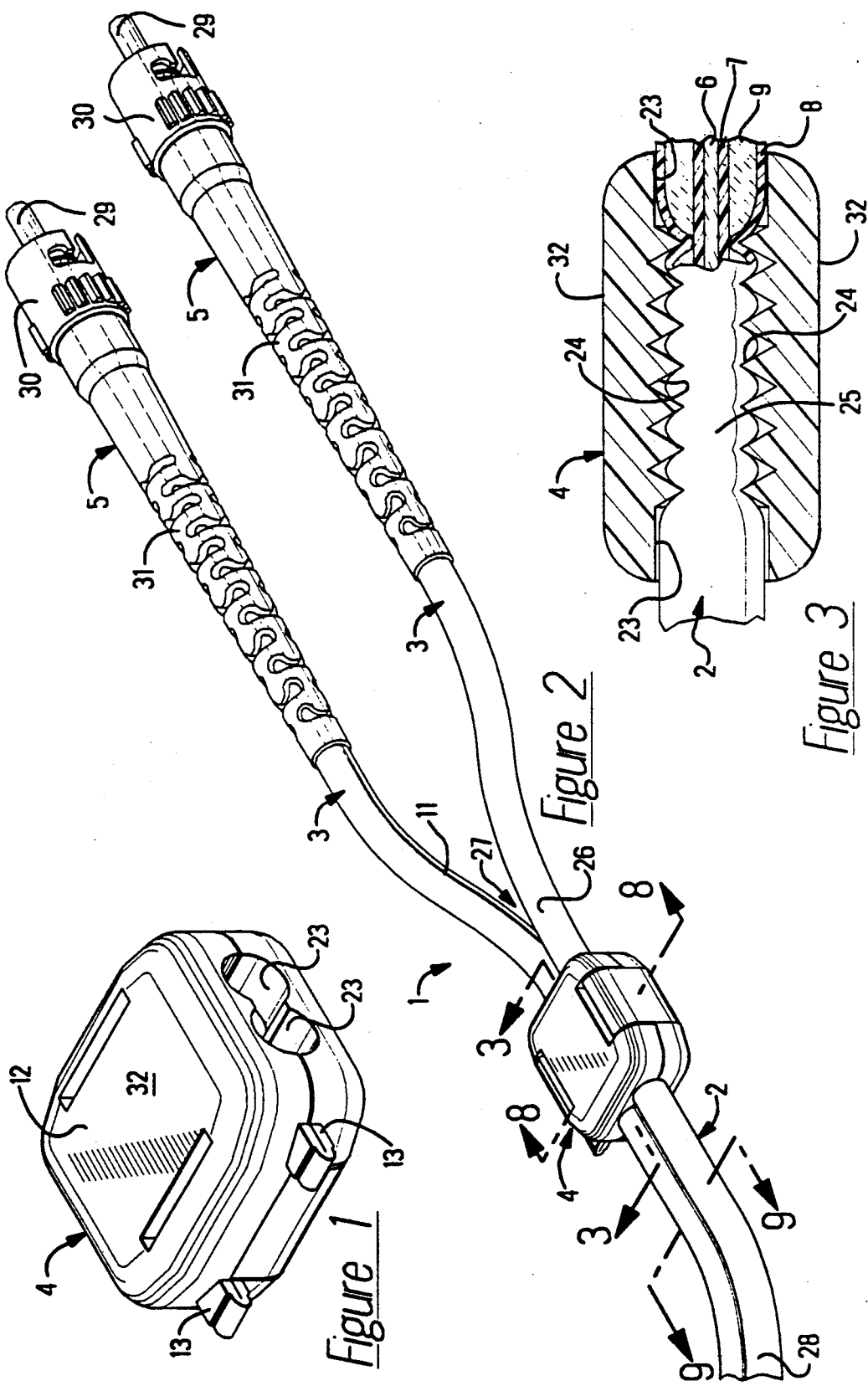

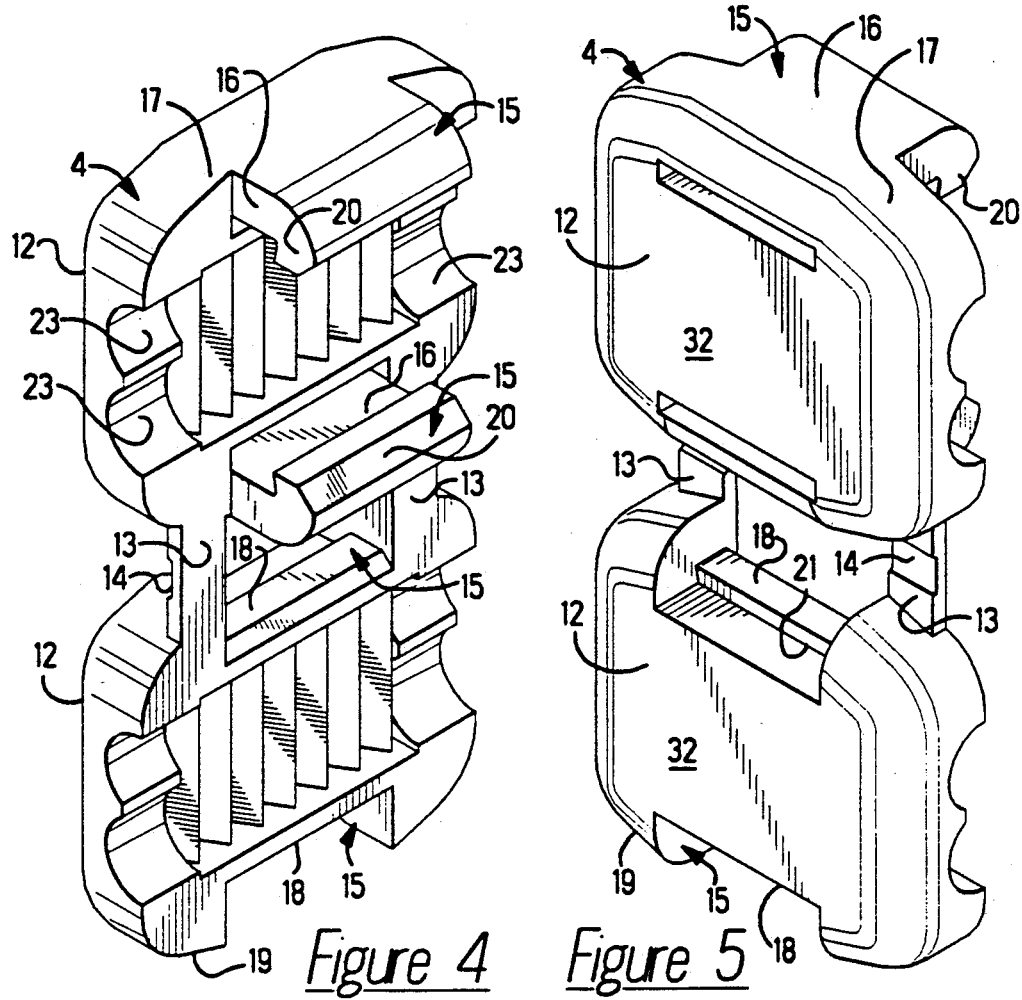
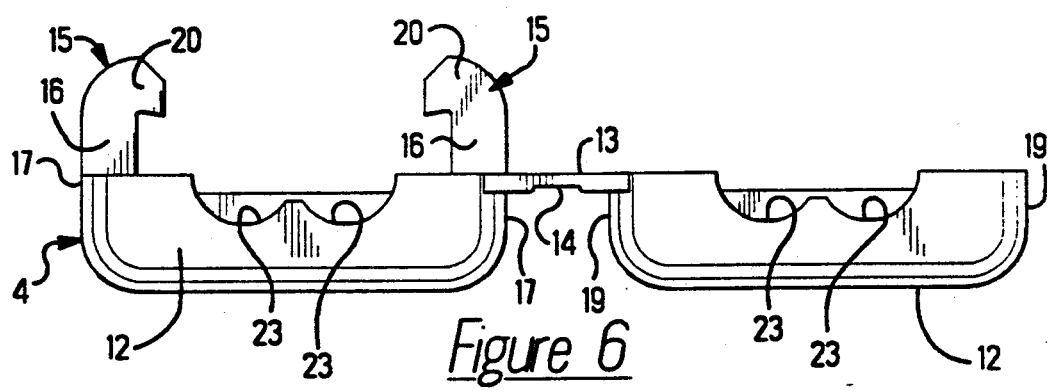

CLAMP FOR SPLIT CABLE OF MULTIPLE OPTICAL FIBERS

FIELD OF THE INVENTION

The invention relates to a transition of a multiple fiber cable to single fiber cable, and more particularly, to division of a multiple fiber cable into single fiber cables.

BACKGROUND OF THE INVENTION

Multiple fiber cable is constructed with two optical fibers that provide two separate paths of communication for transmitting optical signals. A sheath of the cable encloses the two optical fibers. According to one form of cable construction, the cable includes a sheath that must be removed to uncover the two optical fibers. There is known in U.S. Pat. No. 4,826,277, a transition of a multiple fiber cable to a single fiber cable. Such a transition is adapted for assembly with optical fibers that have been uncovered by removing corresponding portions of the cable. Then the optical fibers are covered by corresponding, auxiliary sheaths. Then corresponding strain relief members are assembled to the optical fibers. Then a shell is assembled for holding the strain relief members in place.

According to another form of cable construction, a sheath of the cable is constructed for ease in splitting into two sections. The two optical fibers are in the sections, and are split apart from each other at least partially along the length of the cable. The optical fibers are maintained in split sections of the sheath, and are connected with corresponding optical connectors to facilitate their use as separate paths of optical communication. Heretofore, a shrinkable wrap was applied over the cable and was shrunk to hold the cable together. The wrap prevented a split in the cable from progressing along the length of the cable. The use of a shrinkable wrap requires a source of heat, for example, a heat gun, to cause the wrap to shrink.

SUMMARY OF THE INVENTION

The invention is a clamp that is constructed for assembly on a multiple fiber cable without the use of a heat gun or other tool. The clamp is constructed with sections capable of assembly by hand onto the cable, and capable of interlocking to each other. Accordingly, a clamp comprises, two sections hinged together for closure toward each other and onto an exterior of a divisible, multiple fiber cable, frictional surfaces along interior facing surfaces of the sections being adapted for engaging along an exterior of a first portion of the multiple fiber cable, and the clamp being assembled on the exterior for holding the first portion together while the multiple fiber cable is split partially along its length into single fiber cables and while optical connectors are assembled to the single fiber cables.

The invention further resides in a method for constructing a transition of a multiple fiber cable to single fiber cable involving, splitting a multiple fiber cable, holding the cable together to prevent progression of a split in the cable, and assembling optical conductors to the single fiber cable.

U.S. Pat. No. 3,332,053 discloses a known cover having hinged sections that close together to enclose an electrical contact and a portion of an electrical wire, after the contact has been connected to the wire. According to U.S. Pat. No. 3,836,944, a known cover has hinged sections that close together to insert a pair of insulated wires into slots of an electrical contact, and to cover the contact and portions of the wires. The contacts penetrate the insulation covering the wires, and also the wires, to apply force at the points of engagement with the wires, which force is retained as necessary for reducing electrical resistance to the flow of electricity across the points of engagement.

By contrast, optical fibers that are stressed by deformation or by curvature exceeding a tolerable, minimum curvature in the fibers will cause attenuation of optical signals. Thus, optical fibers must avoid deformation beyond a tolerable or allowable limit and curvature exceeding a tolerable or allowable, minimum curvature.

According to a feature of the present invention, the cover applies gripping forces on a multiple fiber cable by noninvasive deformation of the cable exterior, whereby deformation is incurred by the cable to absorb the brunt of gripping forces, and such deformation is substantially restricted to an outer jacket and strength members of the cable, and harmless amounts of deflection and bending are incurred by the buffer covered optical fibers within the interior of the cable.

For an understanding of the invention, reference will now be made by way of example to a following detailed description in conjunction with accompanying drawings.

DESCRIPTION OF THE DRAWINGS

FIG. 1 is an enlarged perspective view of a closed clamp.

FIG. 2 is an enlarged perspective view of a transition of a multiple fiber cable to single fiber cable, together with a clamp as shown in FIG. 1.

FIG. 3 is a section view taken along the line 3—3 of FIG. 2.

FIG. 4 is an enlarged perspective view of an open clamp, illustrating interior surfaces.

FIG. 5 is an enlarged perspective view of an exterior of the clamp as shown in FIG. 4.

FIG. 6 is a front view of an open clamp.

With reference to FIG. 1, a transition 1 of a multiple fiber cable 2 to single fiber cables 3, 3 comprises, a clamp 4 applied to the multiple fiber cable 2, and corresponding optical connectors 5, 5 applied to the single fiber cables 3 formed by splitting the multiple fiber cable 2.

With reference to FIG. 9, construction of the cable 2 will now be discussed. The cable 2 includes two optical fibers 6, 6 and two cylindrical buffers 7, 7 concentric with corresponding optical fibers 6, 6. A polymeric, hollow outer sheath 8 encircles multiple strands of strength members 9, for example, multiple strands of KEVLAR, a trademark of E. I. Du Pont de Nemours & Company, Wilmington, Del., U.S.A. The strength members 9 are distributed in a cylindrical space 10 between the sheath 8 and a corresponding buffer 7. The sheath 8 has two cylindrical portions corresponding with the buffers 7, 7. A unitary web 11 that is frangible joins the two cylindrical portions of the sheath 8.

With reference to FIGS. 4, 5 and 6, the clamp 4 is of unitary plastics construction, formed by molding, for example, with two sections 12, 12 hinged together by hinges 13, 13 formed by strips that are readily doubled back on themselves along corresponding grooves 14, 14 that provide corresponding fold lines across the strips. When the two sections 12, 12 are closed toward each other, FIG. 1, each of interlocking portions 15, 15, in the form of a latch bar 16 extending from a side 17 of a first one of the sections 12, 12, and a corresponding catch groove 18 on a side 19 of a second one of the sections 12, 12, hold the sections 12, 12 interlocked together. Each of the latch bars 16 has a turned end 20 to interlock against a shoulder 21 of one of the grooves 18. Each of the latch bars 16 is resiliently deflectable for being cammed outwardly by, and to glide over, a surface of the catch groove 18 and move past the shoulder 21, and then, to pivot inwardly to catch against the shoulder 21 and resist separation of the sections 12, 12.

Figure 7:
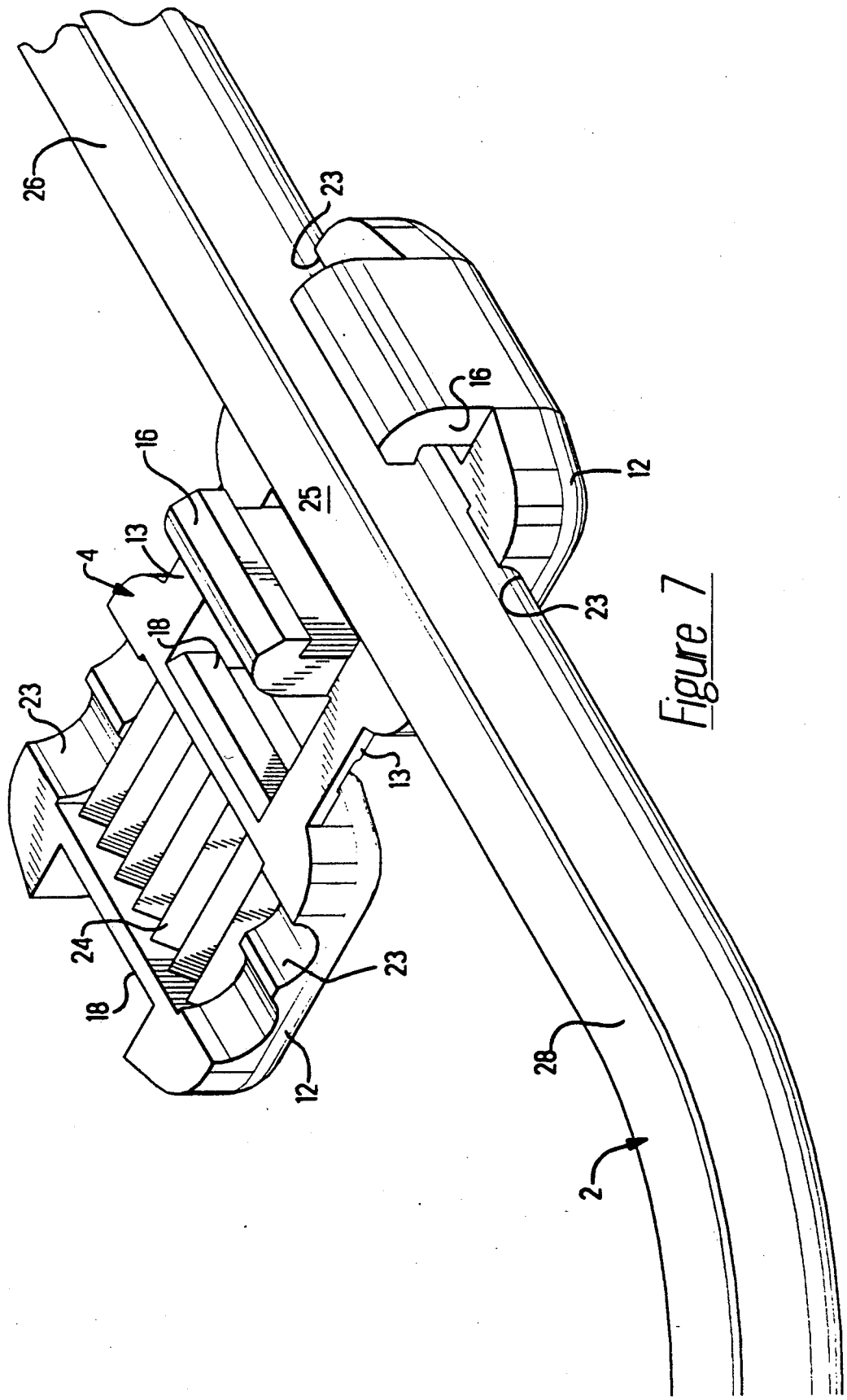
FIG. 7 is an enlarged perspective view of an open clamp being assembled to a multiple fiber cable.

Interior surfaces 22, 22 of the sections 12, 12 include recessed entryways 23, 23 along opposite edge margins of the sections 12, 12. The entryways are semi-cylindrical in shape to conform to the exterior of the multiple fiber cable 2. The interior facing surfaces 22, 22 further include friction surfaces 24, 24 in the form of a series of projecting ridges. The ridges are between the entryways 23, 23 and extend transversely of the entryways 23, 23. When the sections 12, 12 close toward each other, the entryways 23, 23 face and oppose one another, and engage the exterior of the multiple fiber cable 2. The ridges of the sections 12, 12 face and oppose one another and engage the exterior of the cable 2.

The transition 1 is constructed as will be described with reference to FIGS. 2, 7 and 8. With reference to FIG. 7, a first portion 25 of the multiple fiber cable 2 is laid to extend through corresponding entryways 23, 23 on one of the sections 12, 12, and across a corresponding frictional surface 24.

Figure 8:
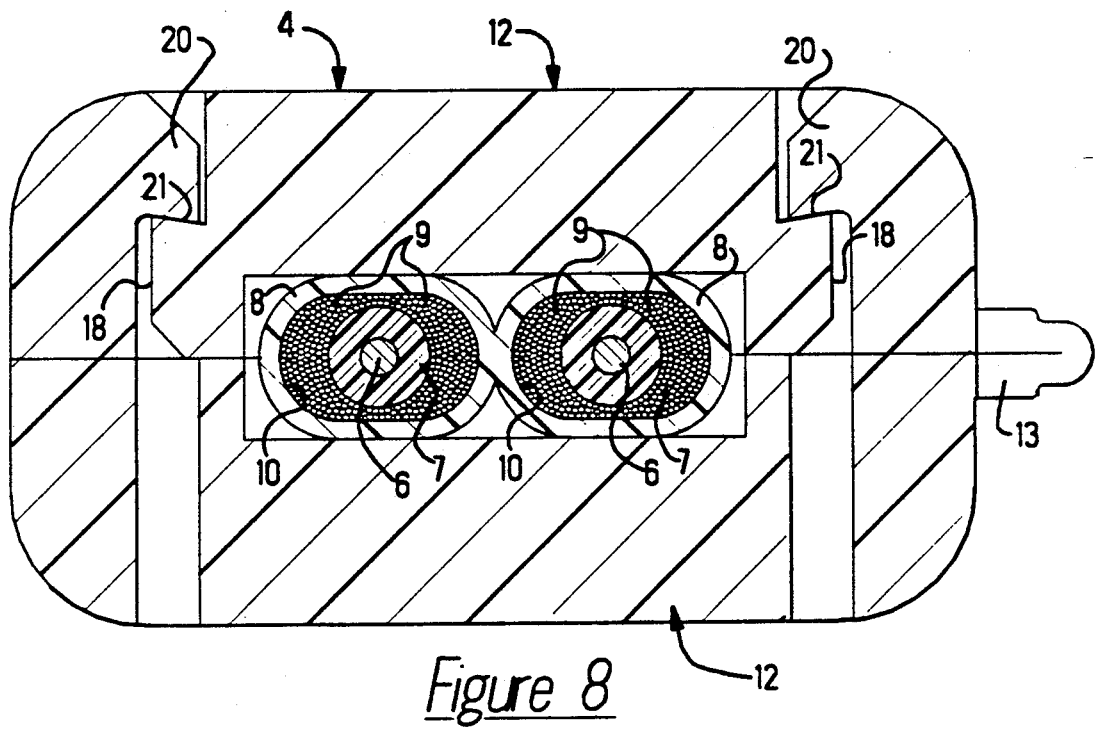
FIG. 8 is an enlarged section view taken along the line 8—8 of FIG. 2.
Figure 9:
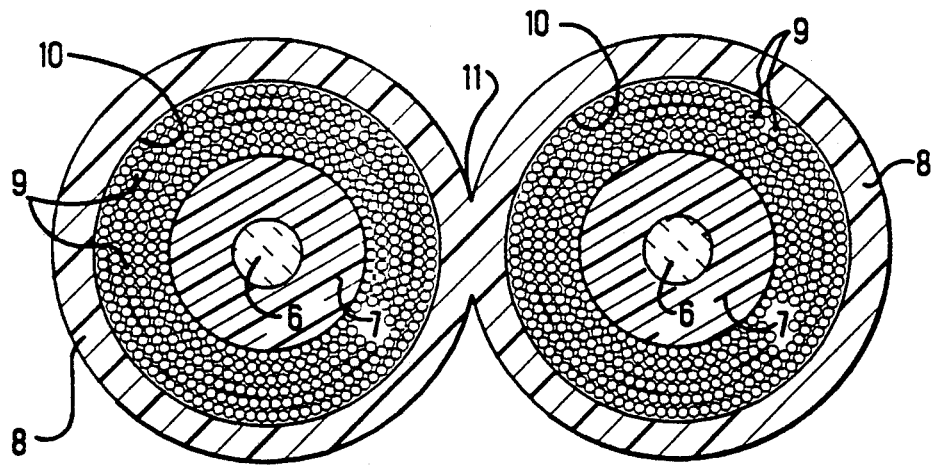
FIG. 9 is an enlarged section view taken along the line 9—9 of FIG. 2.

The sections 12, 12 are closed together, and are latched to cover the first portion 25 of the multiple fiber cable 2, FIGS. 2 and 8. With particular reference to FIG. 8, the friction surfaces 24, 24, when the sections 12, 12 are closed, compress the multiple fiber cable 2 and deform inwardly the outer sheath 8 without invasive penetration of the sheath 8. The space 10 in the interior of the sheath 8 forms a non-cylindrical, flattened space 10 for the strength members 9 to reside. Compression applied by the sections 12, 12 displaces the strength members 9, causing them to become redistributed to new positions in the flattened space 10. The friction surfaces 24, 24 grip the multiple fiber cable 2 and restrain the clamp 4 from movement. An important advantage of the invention resides in the exterior surfaces 32, 32 of broad area of the sections 12, 12 upon which human finger pressure is applied to close and latch together the sections 12, 12 together in engagement with the cable 2. Thus, only finger pressure is required, without the need for a tool.

Attenuation of optical signals carried by the optical fibers 6, 6 would result from deformation and bending of the optical fibers 6, 6 beyond tolerable or allowable limits. An advantage of the invention is, that the clamp 4 is applied only to the exterior of the cable 2, and applies compression force to grip the cable 2 by noninvasive deformation of the cable 2. Noninvasive deformation avoids excessive bending or deformation of the optical fibers 6, 6. Compression force is absorbed by the buffers 7, 7 and the optical fibers 6, 6. The buffers 7, 7 and the fibers 6, 6 remain substantially cylindrical, because the compression force absorbed by them is lower than that required to deform the buffers 7, 7 and the fibers 6, 6 from their substantially cylindrical shapes. Further, the buffers 7, 7 and the optical fibers 6, 6 extend substantially straight through the clamp 4 without excessive bending.

Once the clamp 4 is located on the desired first portion 25 of the multiple fiber cable 2, a second portion 26 of the cable 2 is split, for example, by spreading apart the optical fibers 6, 6. A split 27 is caused to progress along the web 11 until further progress of the split 27 is stopped by the first portion 25 of the multiple fiber cable 2 held together by the clamp 4. The first portion 25 of the multiple fiber cable 2 remains unsplit. The clamp 4 thereby is selected to be applied to a selected position along the multiple fiber cable 2 where further progress of the split 27 is to be stopped. A third portion 28 of the multiple fiber cable 2 extending from the first portion 25 remains unsplit. The split apart, second portion 26 of the cable 2 provides two, single fiber cables 3, 3. Each of the single fiber cables 3 has one optical fiber 6, concentric with a buffer 7 and strength members 9 and enclosed by a corresponding portion of the sheath 8. Each of the single fiber cables 3 is then assembled with a corresponding, known optical connector 5 having an alignment ferrule 29, a coupling nut 30 and a strain relief boot 31. Further details of the known optical connector 5 and its assembly with an optical fiber are disclosed, for example, in U.S. Pat. No. 4,834,487. The clamp 4 is assembled on the exterior only of the first portion 25 of the multiple fiber cable 2, for holding the first portion 25 together while the second portion 26 is split apart along its length into single fiber cables 3, 3 and while optical connectors 5, 5 are assembled with the single fiber cables 3, 3.

Another method for using the clamp 4 will now be described. Instead of using the clamp with a multiple fiber cable 2, the clamp 4 can be used to hold two, single fiber cables 3, 3 together. Such single fiber cables 3, 3 can be those as shown in FIG. 1, as being previously split apart from the multiple fiber cable 2. Alternatively, such single fiber cables 3, 3, can be separate, individual fiber cables 3, 3, not previously split from a multiple fiber cable 3. Each of the entryways 23, 23 on opposite edge margins of the sections 12, 12 has two semicylindrical shapes, side by side, to conform to the exteriors of the two single fiber cables 3, 3. Selected portions of the two cables 3, 3 are selected to be held together in the clamp 4. These selected portions of the two cables 3, 3 are laid to extend through corresponding semicylindrical shapes of the entryways 23, 23 along opposite edge margins of one section 12, and across the corresponding frictional surface 24 of the one section 12. The sections 12, 12 are closed together, and are latched, to cover the selected portions of the two, single fiber cables 3, 3. The cables 3, 3 are held by the clamp, similarly as is the cable 2 was held by the clamp 4, as described previously. The clamp 4 is used to hold two, single fiber cables 3, 3 together at their selected portions. These selected portions can be located at even, or uneven, distances from the ends of the single fiber cables 3, 3.

The clamp 4 is constructed for being pulled along an interior of a conduit, not shown, of the type in common use for routing electrical wires inside walls of a building. To permit the clamp 4 to traverse a conduit interior without catching against an obstruction, the sections 12, 12 are rounded broadly at their edge margins and at their corners. The sections 12, 12 when closed and latched define the profile of the clamp 4 as a whole. The clamp 4 as a whole has such a profile extending transverse to the corresponding, held cables 2, 3 and 3, and is less than an interior cross section profile of an interior of a conduit in common use, known as a three quarter inch conduit, in metric equivalent, 1.905 centimeters in diameter.

We claim:

1. A method of constructing a transition of a multiple fiber cable to single fiber cable, comprising the steps of:

holding together a first portion of the multiple fiber cable by a clamp with sections having frictional surfaces applied to and mounted on the exterior of the multiple fiber cable, splitting a second portion of the multiple fiber cable from one of its ends to the first portion, whereby the second portion is divided into single fiber cables projecting from the first portion held together by the sections of the clamp, and assembling optical connectors on corresponding ends of the single fiber cables.

2. A method as recited in claim 1, further comprising the step of, preventing progressive advance of a split along the cable by mounting the clamp on the exterior only of the multiple fiber cable.

3. A method as recited in claim 1, further comprising the step of; interlocking the sections together prior to the step of splitting a second portion of the multiple fiber cable.

4. A clamp comprising; two sections hinged together for closure toward each other and onto an exterior of a divisible, multiple fiber cable, frictional surfaces along interior facing surfaces of the sections adapted for engaging along an exterior of a first portion of the multiple fiber cable, and the clamp being assembled on the exterior for holding the first portion together while the multiple fiber cable is split partially along its length into single fiber cables and while optical connectors are assembled to the single fiber cables.

5. A clamp as recited in claim 4, wherein the frictional surfaces extend across longitudinally extending optical fibers of the cable and a longitudinally extending groove of the cable.

6. A clamp as recited in claim 4, and further comprising:

interlocking portions of the two sections retain the two sections clamped on the cable.

7. A clamp as recited in claim 4, wherein the frictional surfaces are serrations.

8. A clamp as recited in claim 4, wherein a third portion of the cable extends unsplit from the first portion.

9. A clamp as recited in claim 4, wherein, the sections when closed have a profile extending transverse to the cable that is less than the interior cross section profile of a three quarter inch conduit.

10. A method for using a clamp of the type as recited in claim 4, comprising the steps of:

laying two, single fiber cables through corresponding entryways of one of the sections and over the corresponding frictional surface of said one of the sections, and closing the two sections of the clamp together until the two sections latch together, whereby portions of the two, single fiber cables are covered by the clamp, and are held together in the clamp.

11. A method as recited in claim 9, wherein, the step of closing the two sections further comprises, closing them and latching them with applied finger pressure.

* * * * *